US009092477B2

(12) United States Patent
Nevin et al.

(10) Patent No.: US 9,092,477 B2
(45) Date of Patent: *Jul. 28, 2015

(54) SEMANTIC TO NON-SEMANTIC ROUTING FOR LOCATING A LIVE EXPERT

(71) Applicant: Xpert Universe, Inc., New York, NY (US)

(72) Inventors: James Nevin, New York, NY (US); John Steinhoff, New York, NY (US); Richard Mason, Cos Cob, CT (US); Abraham Zelkin, Oyster Bay, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/291,813

(22) Filed: May 30, 2014

(65) Prior Publication Data
US 2014/0280164 A1 Sep. 18, 2014

Related U.S. Application Data

(63) Continuation of application No. 12/380,761, filed on Mar. 2, 2009, now Pat. No. 8,793,206, which is a continuation of application No. 11/043,014, filed on Jan. 24, 2005, now Pat. No. 7,499,903.

(51) Int. Cl.
G06N 5/00 (2006.01)
G06F 1/00 (2006.01)
G06F 17/30 (2006.01)

(52) U.S. Cl.
CPC .... G06F 17/30386 (2013.01); G06F 17/30731 (2013.01)

(58) Field of Classification Search
CPC .......... G06N 5/02; G06N 5/04; G06N 5/022; G06Q 10/00
See application file for complete search history.

(56) References Cited

U.S. PATENT DOCUMENTS

| 2001/0024497 | A1* | 9/2001 | Campbell et al. ........ 379/265.09 |
| 2003/0167352 | A1* | 9/2003 | Hoshiai et al. ................ 709/318 |
| 2004/0148167 | A1* | 7/2004 | Schimmer et al. ............ 704/240 |

* cited by examiner

Primary Examiner — Jeffrey A Gaffin
Assistant Examiner — Kalpana Bharadwaj
(74) Attorney, Agent, or Firm — Thomas Carulli

(57) ABSTRACT

A system and method of semantic to non-semantic routing for locating an expert. An inquiry-type database has a first layer of inquiry types organized from underlying criteria groupings, (humanly understandable descriptors). Additional layers are associated in a one-to-one correspondence with the first layer of inquiry types. Experts, having individualized knowledge, are listed in a skill-set database associated with the inquiry types. The skill-set database entries are linked to the associated inquiry-type by a numerical routing identifier. An expert is selected from the skill-set database entry linked by the numerical routing identifier. In another embodiment, multiple enterprises are mapped to separate layers of inquiry types having a one-to-one correspondence with the underlying groupings. A skill-set database entry is related to the inquiry type through a numerical routing identifier, the identifier being selected from a respective range of identifiers associated with the respective multiple enterprises.

6 Claims, 3 Drawing Sheets

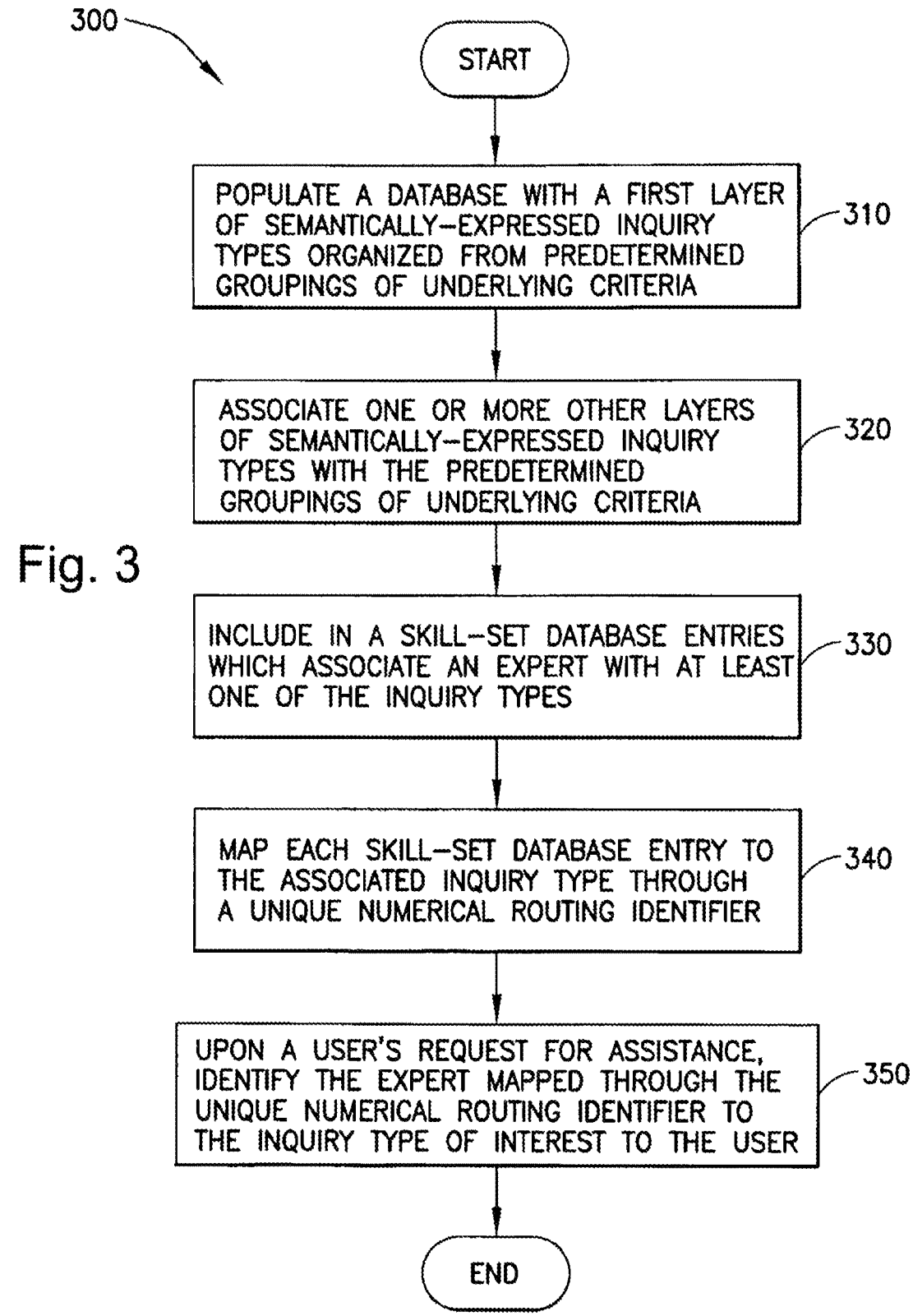

SEMANTIC TO NON-SEMANTIC ROUTING FOR LOCATING A LIVE EXPERT

CROSS-REFERENCE TO RELATED APPLICATIONS

This application is a continuation of U. S. patent application Ser. No. 12/380,761, filed Mar. 2, 2009, which is a continuation of U.S. patent application Ser. No. 11/043,014, filed Jan. 24, 2005, now U.S. Pat. No. 7,499,903.

FIELD OF INVENTION

The present invention relates to a match and route system, and in particular to a match and route system that matches a seeker having an inquiry to an expert having individualized knowledge of the seeker's inquiry.

BACKGROUND OF THE INVENTION

An enterprise having a multitude of personnel has a vast asset of information available, but yet is often faced with difficulties in matching a seeker needing assistance with an inquiry to an expert within the enterprise. Match and route systems have been developed which are capable of connecting a seeker requesting information to an expert. The seeker's inquires are criteria organized into categories of information and are helpful in matching a seeker's request for assistance with the skills of a pool of qualified experts. The result is a live collaboration session between the seeker and a selected expert.

The systems prior to the present invention utilize a technique that matches inquires to skill sets identifying experts by utilizing a fixed identifier, which is dedicated to the associated inquiry and skill set. The data records needed for such systems for even a moderate sized enterprise are labor intensive to create and populate. Extensive effort is expended in "hard-wiring" the connections between the categories of organized criteria and the skills of the qualified expert. Any change in the criteria organization requires an equally extensive and labor intensive effort.

Building and loading the data records is expensive and prohibitive. Missing from the art are techniques that add flexibility to the match and route systems. There exist a need in the art for a technique which facilitates reconfiguring a match and route system with an inexpensive and efficient approach.

Further missing from the art is a system in which a seeker's inquiry is routed to an expert using semantic to non-semantic routing techniques. Also, missing from the art is a system in which a pool of experts can be easily and readily be made accessible to multiple organizations and enterprises. The present invention can satisfy one or more of these and other needs.

SUMMARY OF THE INVENTION

The present invention relates to semantic to non-semantic routing for locating a live expert. In accordance with one aspect of the invention, an inquiry type database is populated with a first layer of inquiry types organized from underlying criteria groupings, which are humanly understandable descriptors. Additional layers of inquiry types are associated in the database with the underlying criteria groupings in a one-to-one correspondence with the first layer of inquiry types. A skill-set database includes entries that associate one or more experts with one or more of the inquiry types and its corresponding layers. The experts each have individualized knowledge of at least one criterion of the underlying criteria grouping for that inquiry type. The skill-set database entries are linked to the associated inquiry-type in the inquiry-type database by a unique numerical routing identifier. Upon a user's request for assistance with a particular inquiry type; an expert is selected from the skill-set database entry linked by the numerical routing identifier.

In another aspect of the invention, multiple enterprises are mapped to separate layers that have a one-to-one correspondence with the inquiry types organized from underlying criteria groupings. For each of the multiple enterprises, a skill-set database entry related to the inquiry type is mapped through a unique numerical muting identifier, the numerical muting identifier being selected from a respective range of numeric routing identifiers associated with the respective multiple enterprises.

These and other aspects, features, steps and advantages can be further appreciated from the accompanying figures and description of certain illustrative embodiments.

BRIEF DESCRIPTION OF THE DRAWING FIGURES

FIG. 3 is a flow diagram illustrating steps in accordance with an illustrated embodiment.

DETAILED DESCRIPTION OF THE ILLUSTRATIVE EMBODIMENTS

By way of overview and introduction, presented and described are embodiments of a match and route system that supports semantic to non-semantic routing of inquiry requests received from a user to an expert having individualized knowledge of at least some portion of the inquiry topic. The match and route system presents a user seeking assistance on a topic with a selection of underlying criteria that are humanly understandable descriptors (semantic identifiers). After the seeker responds to several iterations of semantic identifier presentations, the system is able to select a predetermined semantically-expressed inquiry type that is organized from the underlying criteria grouping selected by the seeker. A skill set is linked to the semantic inquiry type by a unique numeric identifier. The skill set contains the identity of an expert, or group of experts that have the individualized knowledge on the topic being requested by the seeker.

In an embodiment of the invention, a combination of Internet technology and communication queuing/routing systems provide the interactive communication infrastructure to support the semantic to non-semantic muting process which locates a live expert. One such infrastructure can be an automated call distribution system, which is a computerized phone system that routes incoming telephone calls to operators or agents. Alternatively the infrastructure can be a system that supports instant messaging and Web conferencing, as is known in the art. Other infrastructure and applications suitable for routing an information request received from a seeker to an available expert are also within the scope of this embodiment.

Figure 1:
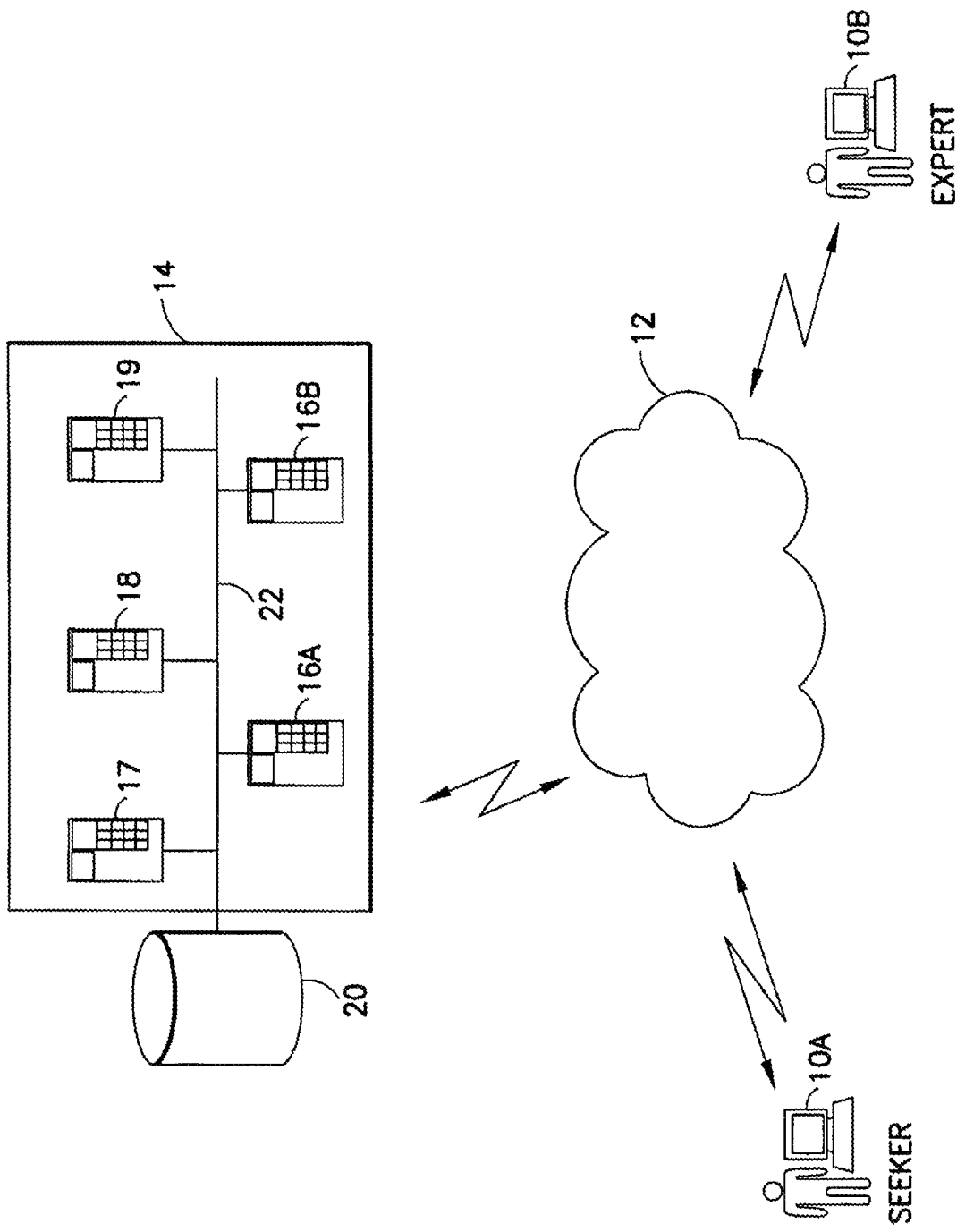
FIG. 1 illustrates an embodiment of a communication network suitable for implementing semantic to non-semantic routing of inquiry requests.

FIG. 1 illustrates an embodiment of a communication network suitable for implementing semantic to non-semantic routing of inquiry requests. FIG. 1 shows components of an exemplary environment in which processes embodying the invention can be implemented. Variations in the arrangement and type of the components may be made without departing from the spirit or scope of the invention. The particular component configuration is not critical to the present invention. FIG. 1 shows enough components sufficient to disclose an illustrative environment for practicing embodiments of the present invention.

The depicted embodiment includes multimedia personal computers, workstations, or computer terminals 10A, 10B (hereinafter collectively referred to as multimedia computer) connected to a communication network 12 (e.g., the Internet) to access a host server 14 at some remote location. The multimedia computer can also be a thin client (e.g., a network computer that is designed to serve as the client for client/server architectures), a term known to persons of skill in the art. The multimedia computers 10A, 10B may, for example, include bidirectional audio/visual capability, e.g., speakers, microphone, or audio/video webcam. Optionally, connected to the multimedia computer is an electronic whiteboard, tablet, or other device (not shown) that permits interactive document creation, viewing, and mark-up across the communication network 12.

Communication network 12 can include a local area network ("LAN"), a wide area network ("WAN"), the Internet, or a combination of all three interconnected by routers (not shown). A router is a intermediary communications network device that links many computers through a mesh of possible connections, a router receives transmitted messages and forwards them to their correct destinations over available routes. On an interconnected set of networks—including those based on differing architectures and protocols—a router acts as a link between the networks, enabling messages to be sent from one to another. The communication links within a network typically include twisted pair, fiber optics, or coaxial cable, while communication links between networks may utilize analog telephone lines, full or fractional dedicated digital lines, Digital Subscriber Lines (DSLs), wireless links, hybrids of the foregoing or future technologies, or other communications links known to those skilled in the art.

At least one multimedia computer 10A is provided at a remote location accessible to a seeker, an individual user (or group of users) desiring to locate an expert in a particular field of interest. At least one other multimedia computer 10B is provided at another remote location accessible to the expert, an individual (or group of individuals) having individualized knowledge of a subject of interest to the seeker.

Multimedia computer 10A, 10B includes a central processing unit (CPU), a video display adapter, and memory. The memory generally includes RAM, ROM, and a permanent mass storage device, such as a disk drive. The memory stores an operating system, a BIOS, and programs for controlling the operation of the multimedia computer. The memory can also be loaded with software specific to practicing embodiments of the present invention. It will be appreciated that these components may be stored on a computer-readable medium and loaded into memory of multimedia computer 10A, 10B using a drive mechanism associated with the computer-readable medium, such as a floppy disk drive, an optical drive, such as a CD-ROM/DVD-ROM drive, and/or a hard disk drive. An input/output interface can also be provided for receiving input from a mouse, keyboard, or other input device. The memory, network interface unit, video display adapter, and input/output interface are all connected to the processing unit via a bus. Other peripherals may also be connected to the processing unit in a similar manner. For example, the interface may also be provided at a terminal, for displaying accessed data, computed scores, and so on.

It should be understood that the multimedia computer 10A, 10B could also be embodied as any one of a great variety of electronic devices ranging from general purpose computing machines to less general devices such as personal digital assistants (PDAs) or smart phones, to a special purpose devices such as DVB-H enabled mobile devices. Regardless of the physical form of the multimedia computer 10A, 10B, it includes a local memory, a processor, and input/output capabilities to permit interaction with a user.

The host server 14 provides a user interface, such as a Web page(s), using an Internet facility such as the World Wide Web. The host server includes at least one processor and operating instructions, and is operable to perform a selection process that matches the seeker to an expert. The host server is capable of connecting the seeker and expert via the aforementioned infrastructure. In a preferred embodiment the seeker is put in communication with the next best available expert. The host server processor can also be a distributed processor architecture as is known to persons of ordinary skill in the art.

The communication path is an interactive real time path that supports participants engaging in a dialog and discussion. Exhibits (e.g., view graphs, Power Point presentations) can be displayed across the network. Typical communication paths can be the Internet, a telephony connection, a video connection, and a voice-over-internet protocol. Devices that can support such communication and are suitable for implementation of the present invention can include, but are not limited to, cell phones, personal digital assistants, hand-held computers, and two-way audio-visual devices. These devices are within the collective term "multimedia computer" as used herein.

The host server 14 can be configured in a multi-server architecture, which has distributed servers performing particular functions. In such an embodiment, the multiple servers are interconnected via a local area network, a wide area network, or any other network (local or remote) 22. For example, the multi-server architecture can include, but is not limited to, portal servers 16A, 16B interfacing with the multimedia computers 10A, 10B (alternatively, a single portal server can interface with multimedia computers 10A and 10B), an application server 17, a multiplex (MUX) server 18 to manage end-user connections, and a database server 19 to connect to a database 20. The databases themselves are records organized in computer readable/writeable memory, and can be located in a datastore, or any other suitable data mass storage device. The database 20 can be connected to network 22, communication network 12, or both.

Figure 2:
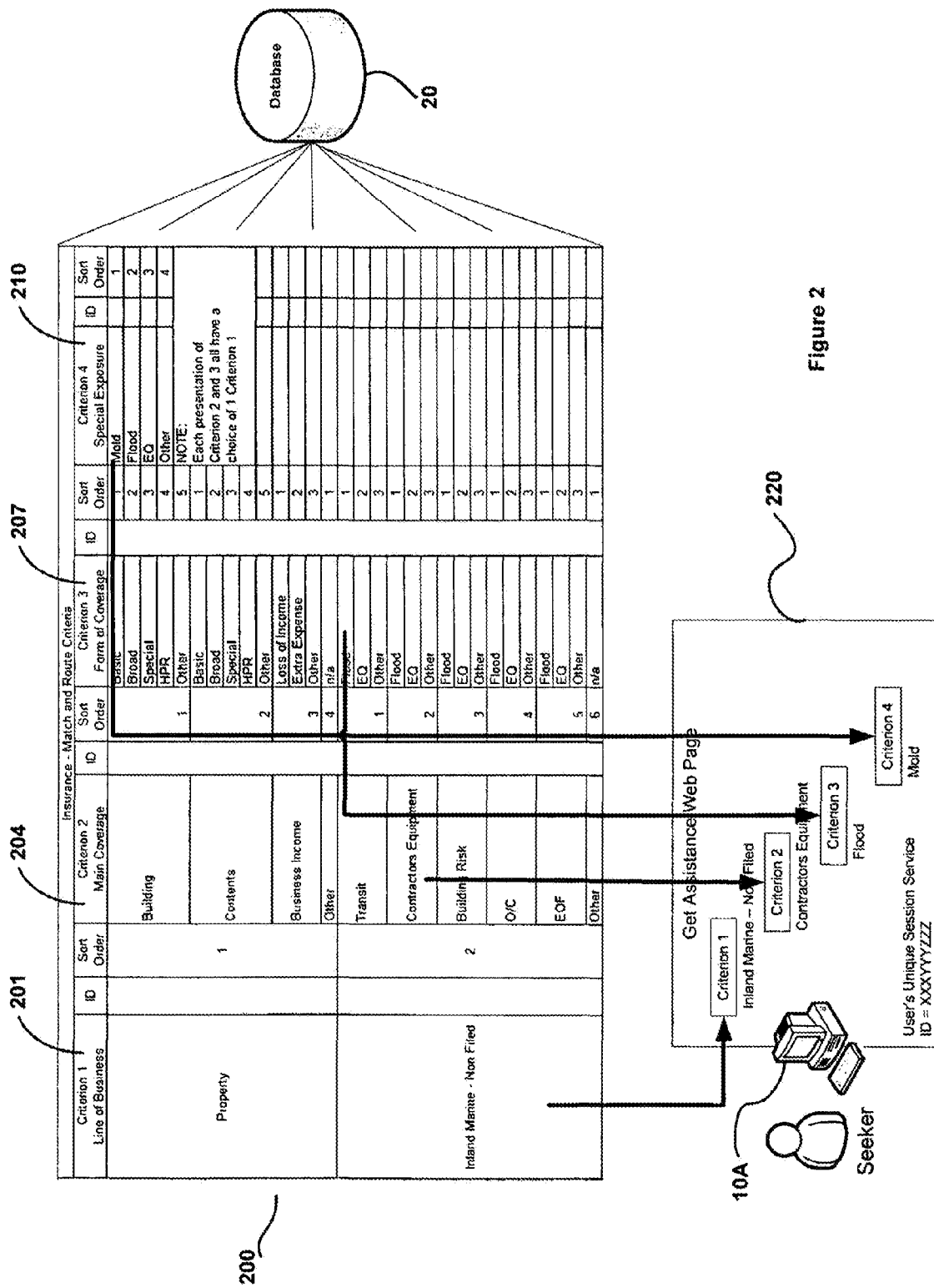
FIG. 2 depicts a table of semantic routing criteria.

FIG. 2 depicts a table of semantic muting criteria 200 which is stored in the database 20. The particular semantic routing criteria is retrieved from the database for a specific organization. The semantic routing criteria are organized into predetermined groups that identify an inquiry type. The predetermined groups are setup in accordance with the specific organization's preferences. For example, a user seeking information is presented with a Get Assistance Page 220. The Get Assistance Page presents criterion selections that a seeker selects before the system can locate an expert. For example, FIG. 2 depicts a Get Assistance Page 220 related to the insurance industry, and presents four criterion selections. However, the presentation of fewer or greater criterion selections is also within the scope of the invention. Criterion selection 201 is labeled "Line of Business." In this example, the user can choose between the criteria of property or inland marine businesses. A second criterion selection 204 is then presented. The underlying criteria of criterion selection 204 are predetermined and can be dependent on criterion selection

201, or can be independent of criterion selection 201. Here, the underlying criteria that are to be presented as criterion selection 204 are dependent on the selection made for criterion selection 201. Similarly, the underlying criteria presented for criterion selection 207 is dependent on the previous selection of criterion selection 204. In this manner, the criterion selections 201, 204, 207 have a hierarchal relationship. However, the underlying criteria presented for criterion selection 210 is independent of criterion selection 207, and is presented regardless of the previous choice.

It can be easily understood by a person of ordinary skill in the art that all the criterion selections 201, 204, 207, 210 can have a hierarchal relationship, can be independent, or a combination of hierarchal and independent relationship. Each subsequent criterion selection 204, 207, 210 available for presentation to a seeker has been predetermined in accordance with the organization's preferences. The organization can choose to limit the combination of criterion selections to fit within a prescribed notion of what areas are relevant to the organization. After all the criterion selections are made, the system can identify the inquiry type, which is the specific grouping of underlying criteria predetermined by the organization.

Additional layers of criterion selections are setup in accordance with the organization's preferences. These additional layers are related to the first layer by having a one-to-one correspondence with the inquiry types, which are the groupings of underlying criteria predetermined by the organization. The selection of a particular layer for presentation to a seeker can be determined by a user profile or an organization profile. These profiles can be specified by the organization, or the organization can specify that seekers can have at least some control of their own individual profile. The additional layers of criterion selections are different semantic presentations of the first layer. .These layers can be in different languages, or can be composed in jargon specific to differing levels of knowledge within a field of interest. The layers can also present the underlying criteria in user-centric terms, e.g., part numbers, paper form numbers, functional block identifiers, etc.

FIG. 3 is a flow diagram illustrating process 300. At step 310, an inquiry-type database is populated with the first layer of inquiry-types organized from groupings of underlying criteria. Optionally, the groupings of criteria can be predetermined by an organization or enterprise in accordance with rules selected by that organization or enterprise. One or more other layers of inquiry types are associated with the groupings of underlying criteria, step 320. The other layers of inquiry types have a one-to-one correspondence with the first layer. In this embodiment for every inquiry-type member of the first layer, there is a member for each of the other layers of inquiry types.

At step 330, entries in a skill-set database associate one or more experts with the inquiry-types. The experts each have individualized knowledge of one of more of the criteria that form the underlying grouping of criteria. The skill-set database entries are each mapped, step 340, to the inquiry types associated with the experts in step 330. This mapping is accomplished by associating the skill-set entry and the inquiry type to a unique numerical routing identifier. When a user (seeker) requests assistance with a particular inquiry type, step 350, the expert(s) associated with the skill-set entry mapped to the inquiry type by the numerical routing identifier are located and identified.

When more than one expert is associated with a skill-set entry, multiple experts will be located and identified at step 350. In such a case, a further embodiment of the invention provides a ranking of the experts. The most meritorious ranked expert among the set of experts located is placed in communication with the seeker. Should the most meritorious ranked expert not be available, the next best available expert is selected. The ranking can be based on such factors as the level of the expert's individualized knowledge of the underlying criteria for the inquiry type; predetermined indicators obtained from a profile associated with the seeker, or the organization to which the seeker belongs; the financial costs associated with the expert; the status of the seeker and/or the expert, as well as the importance of the seeker and/or expert to the organization to which they belong. As can be understood by a person of ordinary skill in the art, there are other metrics and techniques available to rank the expert.

In another embodiment, the skill-set database contains entries that associate at least one expert, by a numerical routing identifier, to an inquiry type organized from underlying criteria. The skill-set database can be maintained as a service bureau that provides the experts to seekers originating from multiple enterprises. Each of the respective multiple enterprises is assigned a range of numerical routing identifiers that are unique to the respective enterprise. A first layer of inquiry types organized from underlying criteria, and residing in an inquiry-type database, is associated with one of the respective enterprises. Additional layers of inquiry types having a one-to-one correspondence with the inquiry types of the first layer are associated with other respective enterprises. Mapping the skill-set entries to the respective enterprise related to the respective layers of inquiry types is accomplished by utilizing a numerical routing identifier selected from the range of numerical routing identifiers assigned to each of the respective multiple enterprises. Upon a seeker's request for assistance with an inquiry type related to the seeker's enterprise, the service bureau identifies and locates an expert through the numerical routing identifier for that enterprise.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one described embodiment to another are also fully intended and contemplated. The invention is defined solely with regard to the claims appended hereto, and equivalents of the recitations therein.

The invention claimed is:

1. A method of semantic to non-semantic routing to locate a live expert, the method comprising the steps of:
   populating a database in a computer with predetermined semantically expressed inquiry-types organized from an underlying plurality of criteria groupings that are humanly understandable descriptors;
   maintaining a skill-set database that includes an entry which associates at least one expert who has the ability to address one of the predetermined semantically-expressed inquiry-type, the expert having individualized knowledge of at least one criteria from the underlying criteria grouping for the associated inquiry-type;
   enabling a user seeking assistance to identify at least one of the criteria underlying the assistance request through an interactive process;
   selecting at least one inquiry-type which describes a user's request for assistance based on user interaction; and
   locating the expert through a routing identifier associating the selected predetermined semantically-expressed inquiry-type with an entry in the skill-set database.

2. The method of claim 1, further comprising the step of establishing a real time communication path between the user and the expert.

3. The method of claim 2, wherein the communication path is an interactive real time path that supports participants engaging in a dialog and discussion; wherein examples include but are not limited to Web conferencing, texting, bidirectional audio/visual capability, electronic whiteboards, document co-viewing devices, the Internet, telephony and a voice-over-internet-protocol connection.

4. The method of claim 2, wherein any number of the devices that can be used to support such communication paths include but are not limited to smart phones, PDA's, tablets and other mobile devices.

5. The method of claim 2, wherein when more than one expert is associated with the skill set entry, the experts are ranked by any number of factors, including but not limited to the level of individualized skill or knowledge of the criteria underlying the inquiry-type, value of the expert's time, value or importance of the user seeking assistance, predetermined indicators contained in a profile of a user and/or expert, and factors specific to the organizations a user and/or expert is associated with.

6. The method of claim 2, wherein the interactive process by which the assistance request is defined uses information contained in a profile associated with the user seeking assistance.

\* \* \* \* \*